(12) United States Patent
Zhang et al.

(10) Patent No.: US 7,280,597 B2
(45) Date of Patent: Oct. 9, 2007

(54) SYSTEM AND METHOD FOR DETERMINING CODING MODES, DCT TYPES AND QUANTIZERS FOR VIDEO CODING

(75) Inventors: Ximin Zhang, San Jose, CA (US); Hao-Song Kong, Newton, MA (US); Anthony Vetro, Cambridge, MA (US); Huifang Sun, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 830 days.

(21) Appl. No.: 10/602,963

(22) Filed: Jun. 24, 2003

(65) Prior Publication Data

US 2004/0264571 A1    Dec. 30, 2004

(51) Int. Cl.
*H04N 7/12* (2006.01)
*H04N 11/02* (2006.01)

(52) U.S. Cl. .............................. 375/240.16; 375/240.12
(58) Field of Classification Search ........... 375/240.16, 375/240.13, 240.02; 348/384.1
See application file for complete search history.

(56) References Cited

U.S. PATENT DOCUMENTS 5,333,012 A * 7/1994 Singhal et al. ......... 375/240.04
5,691,770 A   11/1997 Keesman et al. ........... 348/405
5,909,513 A   6/1999  Liang et al. ................ 382/253
6,037,987 A   3/2000  Sethuraman ................ 348/415
6,192,081 B1  2/2001  Chiang et al. ......... 375/340.16
6,226,327 B1  5/2001  Igarashi et al. ........ 375/240.14
6,414,992 B1  7/2002  Sriram et al. .......... 375/240.13

* cited by examiner

*Primary Examiner*—Gims Philippe
*Assistant Examiner*—Erick Rekstad
(74) *Attorney, Agent, or Firm*—Dirk Brinkmen; Clifton D. Mueller; Gene V. Vinokur (57) ABSTRACT

A method encodes a video by first measuring a variance of pixel intensities in a current frame. A number of bits to encode the current frame is assigned according to rate and buffer fullness constraints. A multiplier value is determined directly as a function of only the variance and the number of bits assigned to the current frame. Motion vectors between a reference frame and the current frame are estimated, and a sum of absolute difference (SAD) is based on a motion compensated residual between the reference frame and the current frame. An encoding mode is determined for each macro block in the current frame based on the sum of absolute difference, the motion vectors and the multiplier value. Then, the motion compensated residual is encoded based on the encoding mode, multiplier value and the number of allocated bits.

6 Claims, 6 Drawing Sheets

SYSTEM AND METHOD FOR DETERMINING CODING MODES, DCT TYPES AND QUANTIZERS FOR VIDEO CODING

FIELD OF THE INVENTION

The invention relates generally to the coding of video, and more particularly to determining encoding mode decisions, DCT types and quantizer values to achieve high compression efficiency with low complexity.

BACKGROUND OF THE INVENTION

Video encoding, with compression, enables storing, transmitting, and processing audio-visual information with fewer storage, network, and processor resources. The most widely used video compression standards include MPEG-1 for storage and retrieval of moving pictures, MPEG-2 for digital television, and MPEG-4 and H.263 for low-bit rate video communications, see ISO/IEC 11172-2:1991, "Coding of moving pictures and associated audio for digital storage media at up to about 1.5 Mbps," ISO/IEC 13818-2:1994, "Information technology—generic coding of moving pictures and associated audio," ISO/IEC 14496-2:1999, "Information technology—coding of audio/visual objects," and ITU-T, "Video Coding for Low Bitrate Communication," Recommendation H.263, March 1996.

These standards are relatively low-level specifications that primarily deal with a spatial compression of images or frames, and the spatial and temporal compression of sequences of frames. As a common feature, these standards perform compression on a per-image basis. With these standards, one can achieve high compression ratios for a wide range of applications.

Interlaced video is commonly used to scan format for television systems. In interlaced video, each frame of the video is divided into a top-field and a bottom-field. The two interlaced fields represent odd- and even-numbered rows or lines of picture elements (pixels) in the frame. The two fields are sampled at different times to enhance a temporal smoothness of the video during playback. Compared to a progressive video scan format, interlaced video has different characteristics and provides more encoding options.

At the macro block level, a variety of modes can be used to encode a video, depending on the coding standard. For example, in order to support interlaced video sequences, the MPEG-2 standard has several different macro block coding modes, including intra mode, no motion compensation (MC) mode, frame/field motion compensation inter mode, forward/backward/interpolate inter mode, and frame/field DCT mode. As an advantage, the multiple modes provide better coding efficiencies due to their inherent adaptability.

The encoding tools included in the MPEG-2 standard are described by Puri et al., "Adaptive Frame/Field Motion Compensated Video Coding," Signal Processing: Image Communications, 1993, and Netravali et al., "Digital Pictures: Representation Compression and Standards," Second Edition, Plenum Press, New York, 1995.

In the MPEG-2 standard, after the picture-level coding mode, i.e., frame-picture or field-picture, is determined, each macro block (MB) in the P- or B-frame can be coded by several different modes. Each mode corresponds to specified motion estimation strategy and either a field-based DCT transform or a frame-based DCT transform is applied. In the TM5 reference encoder, the MB mode decision is based only on the sum of absolute difference (SAD) of the motion estimation and the corresponding variance in texture.

Figure 1:
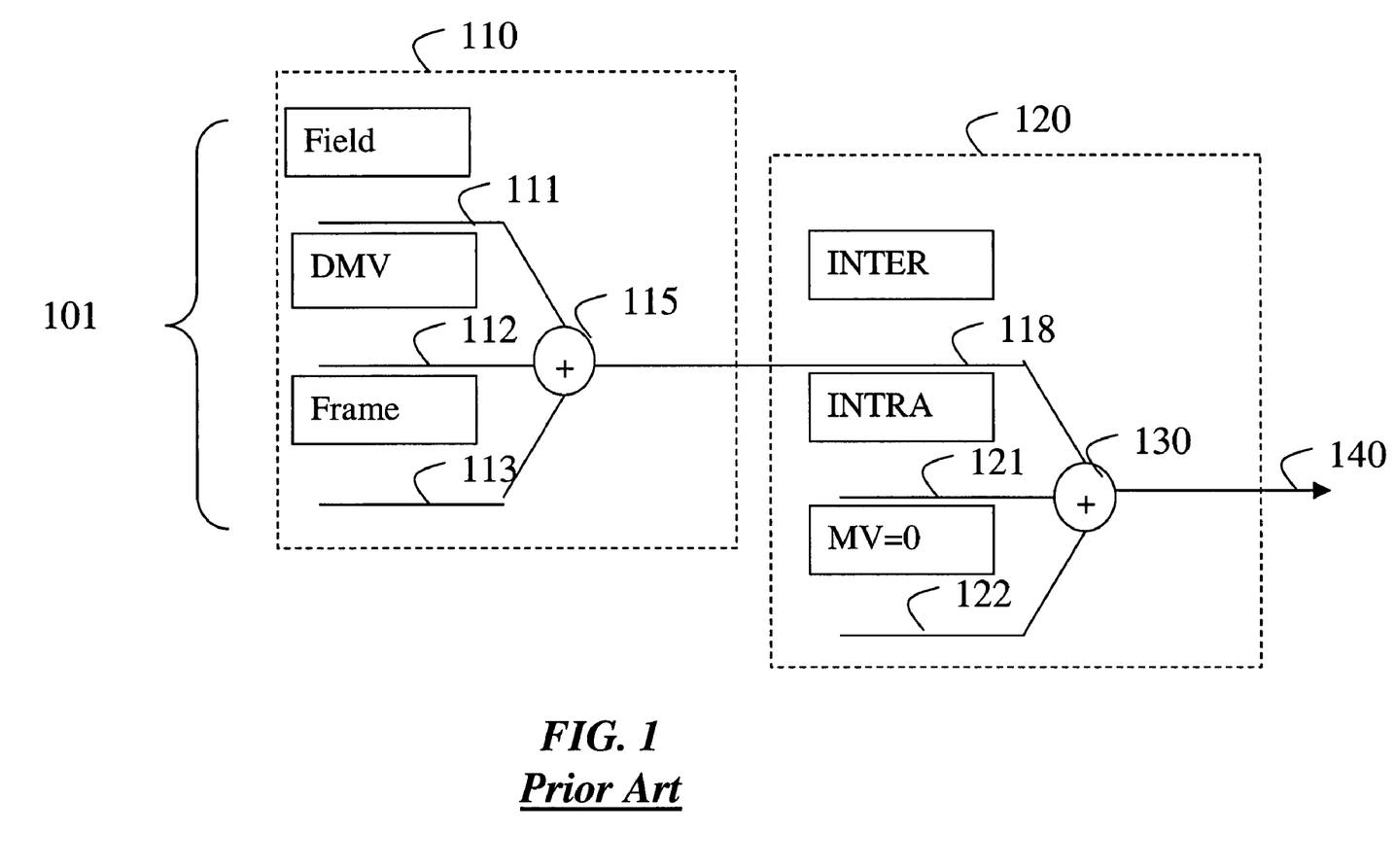
FIG. 1 is a block diagram of a prior art method for determining a macro block.

FIG. 1 shows the MB mode decision in a TM5 encoder for a P-type frame picture. Here, the input modes 101 depend on the picture structure type (P or B), and picture mode (frame or field). A "best inter mode" is selected 110 according to a sum 115 of absolute difference (SAD). For example, for P-type frame picture, there are three inter modes: field 111, frame 113, and dual motion vector (DMV) 112. If the SAD of field mode is the smallest of the three, then field mode is selected as the best inter mode 118. The best inter mode is then compared with intra mode 121 and a mode that just copies the co-positional MB of the previous frame (MV=0) 122 as the prediction. Based on the texture variance and some experience equations 130, a final mode 140 is selected. In the TM5 encoder, a difference of motion vector coding rate is not considered. Depending on the size of motion search window and picture type, the rate difference of the motion vectors corresponding to different modes can be tens of bits, which is significant.

After all of the MB modes are determined, the DCT type of each MB is estimated based on spatial difference between the top and bottom field part of each MB. For the field picture, the DCT type is fixed to the field type. For the frame picture, the DCT type can be either field DCT or frame DCT. In the TM5 encoder, two parameters of the top and bottom field parts are extracted. These are the sum of pixel values and the sum of the square of pixel values. The two parameters of both top and bottom field parts of each MB are combined to estimate the DCT type of the MB. However, the optimal mode decision should be based on both the rate and distortion (RD) information.

Because different modes have different motion vectors, which correspond to different coding rates, it should be obvious that the MB mode decision in the prior art TM5 encoder is not optimal. In the conventional rate control method such as TM5, the rate control is obtained by adjusting the quantization scales based on buffer fullness and localized texture variance. It is independent of the mode and DCT type decision. Obviously, that is not optimal either. Moreover, it can be shown that the TM5 DCT type estimation method is not accurate. Hence, an effective rate control method combining with MB mode decision is desired.

U.S. Pat. No. 5,909,513 "Bit allocation for sequence image compression" issued to Liang et al. on Jun. 1, 1999 describes a method and system for allocating bits for representing blocks that are transmitted in an image compression system. There, the bit allocation is obtained by minimizing a cost function cost=D+$\lambda$R, where D is the total distortion for a frame, R is a desired total number of bits for the frame, a LaGrange multiplier $\lambda$ is obtained by a bi-section based exhaustive search method. The LaGrange multiplier value $\lambda$ can be adjusted block by block by a feedback technique.

U.S. Pat. No. 5,691,770 "Device and method for coding video pictures" issued to Keesman et al. on Nov. 25, 1997 describes a method to improve an MPEG-coded video signal by modifying selected coefficients after conventional quantization. The modification is such that a Lagrangian cost cost=D+$\lambda$R is minimal for a given value of the LaGrange multiplier $\lambda$. The value of $\lambda$ is calculated by means of a statistical analysis of the picture to be coded. The statistical analysis includes estimation of the RD curve on the basis of the amplitude histogram distribution of the DCT coefficients. The searched $\lambda$ is the derivative of this curve at the desired bit rate. In that method for optimal quantization scale selection, the focus is on the determination of the LaGrange multiplier λ. Macro block mode decision is not considered.

In U.S. Pat. No. 6,226,327, "Video coding method and apparatus which select between frame-based and field-based predictive modes," issued on May 1, 2001 to Igarashi et al, a picture is considered as a mosaic of areas. Each area is encoded using either frame-based motion compensation of a previously encoded area, or field-based motion compensation of a previously encoded area, depending on which will result in the least amount of motion compensation data. Each area is orthogonally transformed using either a frame-based transformation or a field-based transformation, depending on which will result in the least amount of motion compensation data.

U.S. Pat. No. 6,037,987, "Apparatus and method for selecting a rate and distortion based coding mode for a coding system," issued to Sethuraman on Mar. 14, 2000 describes a macro block mode decision scheme. In that method, a coding mode that has a distortion measure that is nearest to an expected distortion level is selected. After an initial coding mode is selected, the method applies a trade-off operation. The trade-off operation is actually a simplified cost comparison among the optional modes. The best coding mode after the trade-off operation is selected as the coding mode for the current macro block. In that method, it is assumed that the suitable quantization scale and rate constraint for each macro block can be obtained by a rate-control strategy.

U.S. Pat. No. 6,414,992 "Optimal encoding of motion compensated video," issued to Sriram et al. on Jul. 2, 2002 involves a system and method for optimizing video encoding. For each mode, both distortion and the amount of data required are taken into account. The optimal selection is obtained by comparing all the optional modes in the video encoder. As a rate distortion based method, encoding and decoding the macro block correspondingly is used to obtain the rate and distortion information of each mode. For example, if there are seven optional modes, seven pass encoding and decoding are required.

A similar strategy has been adopted by the Joint Video Team (JVT) reference code, see ISO/IEC JTC1/SC29/WG11 and ITU-T VCEG (Q.6/SG16), "Detailed Algorithm Technical Description for ITU-T VCEG Draft H.26L Algorithm in Response to Video and DCinema CJPs." In that complexity mode decision method, the macro block mode decision is done by minimizing the Lagrangian function $$J(s, c, MODE|QP, \lambda_{MODE}) = SSD(s, c, MODE|QP) + \lambda_{MODE} \cdot R(s, c, MODE|QP),$$

where QP is the macro block quantizer, $\lambda_{MODE}$ is the LaGrange multiplier for mode decision, MODE indicates a mode chosen from the set of potential prediction, and SSD is the sum of the squared differences between the original block s and its reconstruction c. In this method, QP is fixed and $\lambda_{MODE}$ is estimated based on the value of QP.

None of the above prior art methods for optimal mode consider the selection of a quantization scale.

Systems and methods for optimally selecting a macro block coding mode based on a quantization scale selected for the macro block are described in U.S. Pat. No. 6,192,081, "Apparatus and method for selecting a coding mode in a block-based coding system," issued to Chiang et al. on Feb. 20, 2001, and Sun, et al., "MPEG coding performance improvement by jointly optimizing coding mode decisions and rate control," IEEE Transactions on Circuits and Systems for Video Technology, Vol. 7, No. 3, June 1997.

Figure 2:
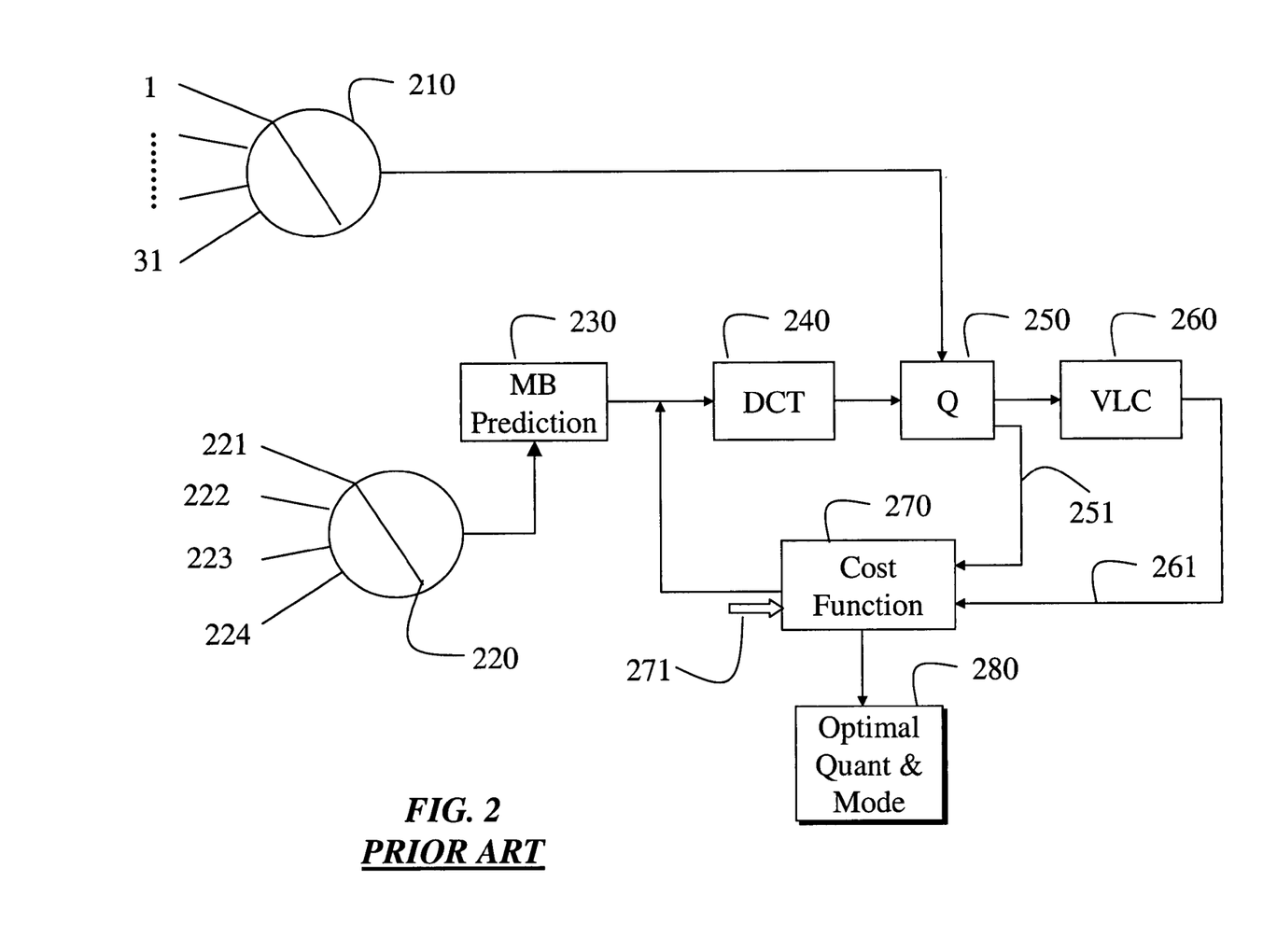
FIG. 2 is a flow diagram of a prior art method for joint mode and quantization scale selection based on rate and distortion values.

FIG. 2 shows a typical prior art system and method 200 for jointly optimizing the coding mode and the quantizer. That system 200 basically uses a brute force, trial-and-error method. The system 200 includes a quantization selector 210, a mode selector 220, a MB predictor 230, a discrete cosine transform (DCT) 240, a quantizer 250, a variable length coder (VLC) 260, a cost function 270 to select an optimal quantization and mode 280. The optimal quantization and mode 280 are achieved by an iterative procedure for searching through a trellis to find a path that has a lowest cost. As the quantizer selector 210 changes its step size, e.g., 1 to 31, the mode selector 220 responds by selecting each mode for each macro block, e.g., intra 221, no MC 222, MC frame 223, and MC field 224.

A macro block level is predicted 230 in terms of a decoded picture type. Then, the forward DCT 240 is applied to each macro block of a predictive residual signal to produce DCT coefficients. The DCT coefficients are quantized 250 with each step size in the quantization parameter set. The quantized DCT coefficients are entropy encoded using the VLC 260, and a bit rate 261 is recorded for later use. In parallel, a distortion calculation by means of mean-square-error (MSE) is performed over pixels in the macro block resulting in a distortion value.

Next, the resulting bit rate 261 and distortion 251 are received into the rate-distortion module for cost evaluation 270. The rate-distortion function is constrained by a target frame budget imposed by a rate constraint $R_{picture}$ 271. The cost evaluation 270 is performed on each value q in the quantization parameter set. The quantization scale and coding mode for each macro block with the lowest value are selected.

In that system, it is assumed that distortion is unchanged for different mode as long as the quantization scale value q is same. Thus, uniform distortion is used as a constraint and the minimization of the object function is equivalent to minimizing the resulted bit-rates. If Q denotes the set of all admissible quantization scales, and M denotes the set of all admissible coding modes, then the complexity of the system is Q×M. Because a single loop for each quantization scale value involves DCT transformation, quantization, distortion and bit count calculation for each macro block, the double loop for joint mode decision and quantization scale selection in that system makes its complexity extremely high.

Therefore, there is a need to provide a system and method for encoding video that achieves a solution for coding mode decision and quantization scale selection with less complexity than the prior art.

SUMMARY OF THE INVENTION

A method encodes a video by first measuring a variance of pixel intensities in a current frame.

A number of bits to encode the current frame is assigned according to rate and buffer fullness constraints.

A multiplier value is determined directly as a function of only the variance and the number of bits assigned to the current frame.

Motion vectors between a reference frame and the current frame are estimated, and a sum of absolute difference (SAD) is based on a motion compensated residual between the reference frame and the current frame.

An encoding mode is determined for each macro block in the current frame based on the sum of absolute difference, the motion vectors and the multiplier value.

Then, the motion compensated residual is encoded based on the encoding mode, multiplier value and the number of allocated bits.

DETAILED DESCRIPTION OF THE PREFERRED EMBODIMENT

The present invention provides a system and method that selects encoding modes, DCT types and quantization scales for efficient video compression. In contrast to the prior art, these selections are made in a cascaded manner, which significantly reduces complexity, while maintaining high coding efficiency.

The improvements of the invention are achieved by directly calculating a multiplier value that is a function of statistics of a current frame, as well as the number of bits allocated to the current frame. This multiplier value is then used to determine the encoding modes, DCT types and quantizer values for macro blocks.

System Structure Overview

Figure 3:
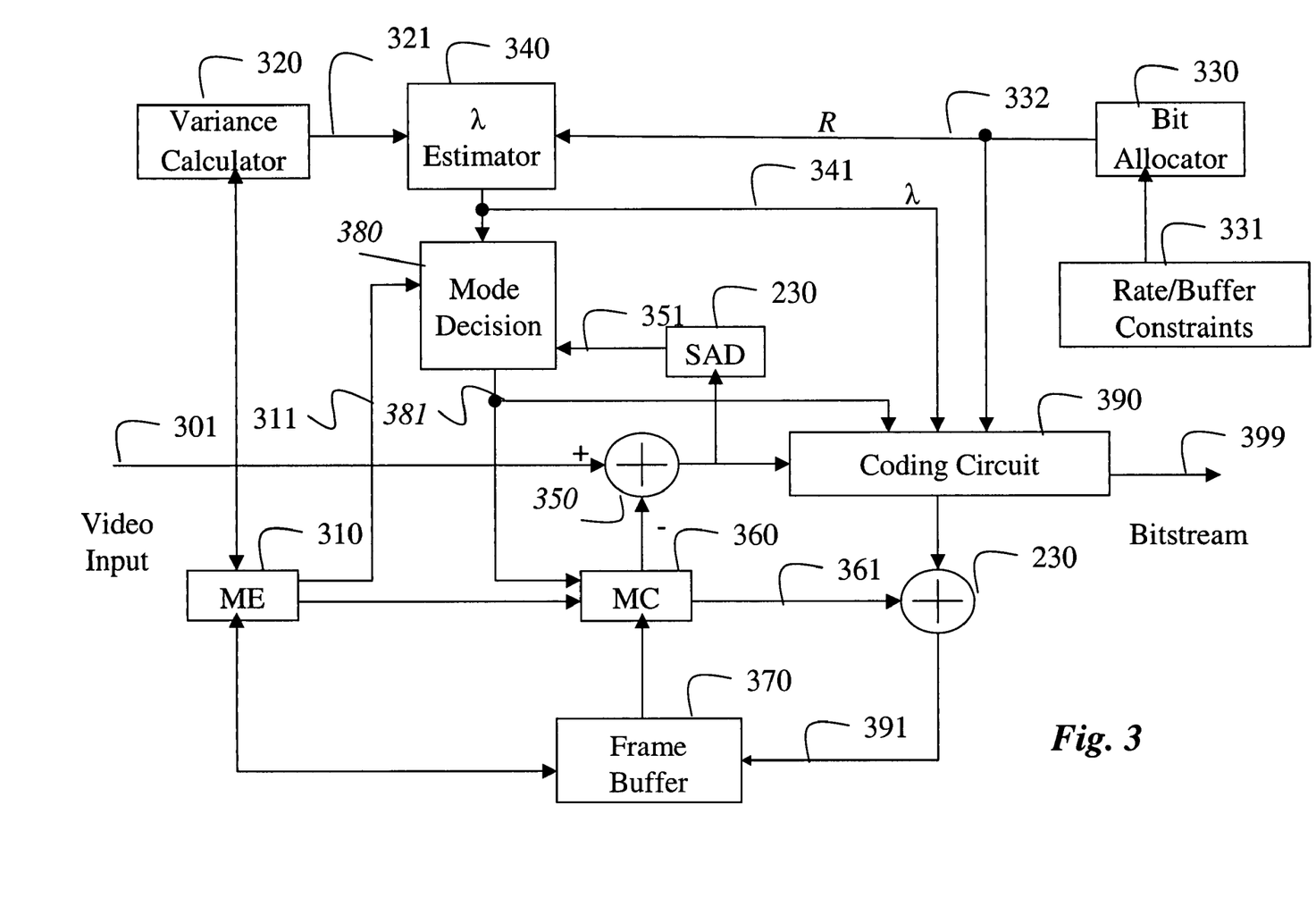
FIG. 3 is a block diagram of video encoding system with λ estimation, quantizer selection and coding mode decision according to the invention.

FIG. 3 shows the video encoding system 100 with λ estimation, quantizer selection and coding mode decision according to the invention. Based on an input video 301, motion estimation (ME) 310 is performed for predictive coded frames to yield motion vectors. A variance calculator also uses the input video to calculate 320 a localized variance of pixel intensity, i.e., texture. Rate and buffer fullness constraints 331 are input to a bit allocator 330 to determine the number of bits assigned to the current frame. The texture variance 321 and assigned bits 332 are sent to an estimator 340 to yield a multiplier value λ 341.

A sum of absolute differences (SAD) 351 is computed 350 based on a residual between a current input frame and a motion compensated prediction. The prediction is formed as a result of a motion compensation (MC) 360 using estimated motion vectors from ME 310 and reference picture data stored in a frame buffer 370. The multiplier value 341, motion vectors 311 and SAD 351 are then sent to a mode decision module 380, which determines a coding mode 381 for the macro blocks.

The coding mode of the macro block is sent to the MC 360 to yield a motion compensated prediction 361 in accordance with the selected coding mode. The coding mode 381 along with the motion compensated prediction is then sent to a coding circuit 400 to produce a bitstream 399. The detailed operation of the coding circuit is described below. A reconstructed frame 391 is produced based on an output of the coding circuit and the MC module. The reconstructed frame is stored in the frame buffer 370.

Cost Function

To achieve a high coding efficiency, we evaluate a cost function. Let $D(R_i)$ and $R_i$ be the distortion and rate of MB i, respectively. To minimize the average distortion, we minimize the cost function, $$J(\lambda) = \sum_{i=0}^{N-1} D_i(R_i) + \lambda \sum_{i=0}^{N-1} R_i \text{ subject to } \sum_{i=0}^{N-1} R_i \leq R_{budget} \quad (1)$$

where N is the total number of MB's in the picture, and λ is the multiplier value. In the following, we describe a low-cost means to calculate this multiplier value without employing an iterative solution.

Estimator for λ

From equation (1), the minimum of the cost function is evaluated by setting its derivative to zero, $$\frac{d(J(\lambda))}{d(R)} = \frac{d(D(R))}{d(R)} + \lambda = 0, \text{ and} \quad (2)$$

$$\text{consequently, } \lambda = -\frac{d(D(R))}{d(R)}.$$

According to "*Digital Coding of Waveforms*" by N. Jayant and P. Noll, Englewood Cliffs, N.J.: Prentice Hall, 1984, if we use square error as the measurement of the distortion, then the rate for an ideal Gaussian source picture is $$R = \frac{1}{2} \log_2 \frac{\sigma^2}{D}$$

where $\sigma^2$ is the variance of pixel intensities, and D is the distortion. Substituting the above into equation (2), leads to a relation: $\lambda = 2\ln2 \times \sigma^2 2^{-2R}$ The above relation is valid for a Gaussian source. However, the actual picture typically resembles a generalized Gaussian distribution instead. For a generalized Gaussian distribution, it is difficult to obtain an explicit expression, due to the complex nature of the distribution. However, we can obtain the lower and upper bounds of its function according to methods described in Cover et al., in "Elements of Information Theory," New York: Wiley, 1991, as $$h(X) - \frac{1}{2}\log_2(2\pi e)D \leq R(D) \leq \frac{1}{2}\log_2 \frac{\sigma^2}{D},$$

where h(X) is a differential entropy of a generalized Gaussian source. According to this bound, we deduce that $D(R) \leq \sigma^2 2^{-2R}$. Denoting $D(R) = F(R) \times \sigma^2 2^{-2R}$, we then obtain $$\frac{d(D(R))}{d(R)} = \sigma^2 2^{-2R} \frac{d(F(R))}{d(R)} - 2\ln2 \times \sigma^2 2^{-2R} \times F(R) =$$

$$\sigma^2 2^{-2R} \left( \frac{d(F(R))}{d(R)} - 2\ln2 \times F(R) \right).$$

Given that $$2\ln 2 \times F(R) - \frac{d(F(R))}{D(R)} = F_1(R),$$

the following result can be obtained $$\lambda = F_1(R) \times \sigma^2 2^{-2R}.$$

To find an effective expression of $F_1(R)$, one practical approach is numerical approximation. In our invention, we use the following procedure to estimate the expression of $F_1(R)$.

We initialize $\lambda$ to a small value. Then, we apply the value of $\lambda$ into the encoding process, as shown in FIG. 3, and select the quantizer value that generates the minimum cost in each macro block. Next, we record the picture rate R after all of the macroblocks have been encoded. Then, we increase the value of $\lambda$ and repeat the encoding procedure to obtain more operating points. After enough data are obtained, we can approximate a curve for $\lambda$ and R.

Through numerous experiments, we found that $F_1(R)$ can be estimated by $$F_1(R) = \frac{c}{R},$$

where c is a constant. As a result, $$\lambda = c\sigma^2 \frac{2^{-2R}}{R}, \quad (3)$$

where R is an equivalent pixel rate, i.e., picture rate/picture size, $\sigma^2$ is the average picture texture variance, and c is a constant.

In most of the prior art coding methods, CBR coding is utilized to obtain the constant picture rate among the same type pictures. However, this constraint is not rigorous. If we can guarantee that the rate constraint for each GOP is satisfied, then the method that results in smaller distortion is preferred. Thus, even if the initial $\lambda$ is not accurate, it can be adjusted in the following pictures and any small variations in rate can be neglected. We have also found that a big difference in the multiplier value only causes a small difference in the rate. That is, the inaccurate initial estimation does not cause big rate difference.

In summary, we estimate the value of $\lambda$ by a using the rate allocation and variance information of a current picture according to equation (3). It is updated in subsequent pictures as described below.

Figure 4:
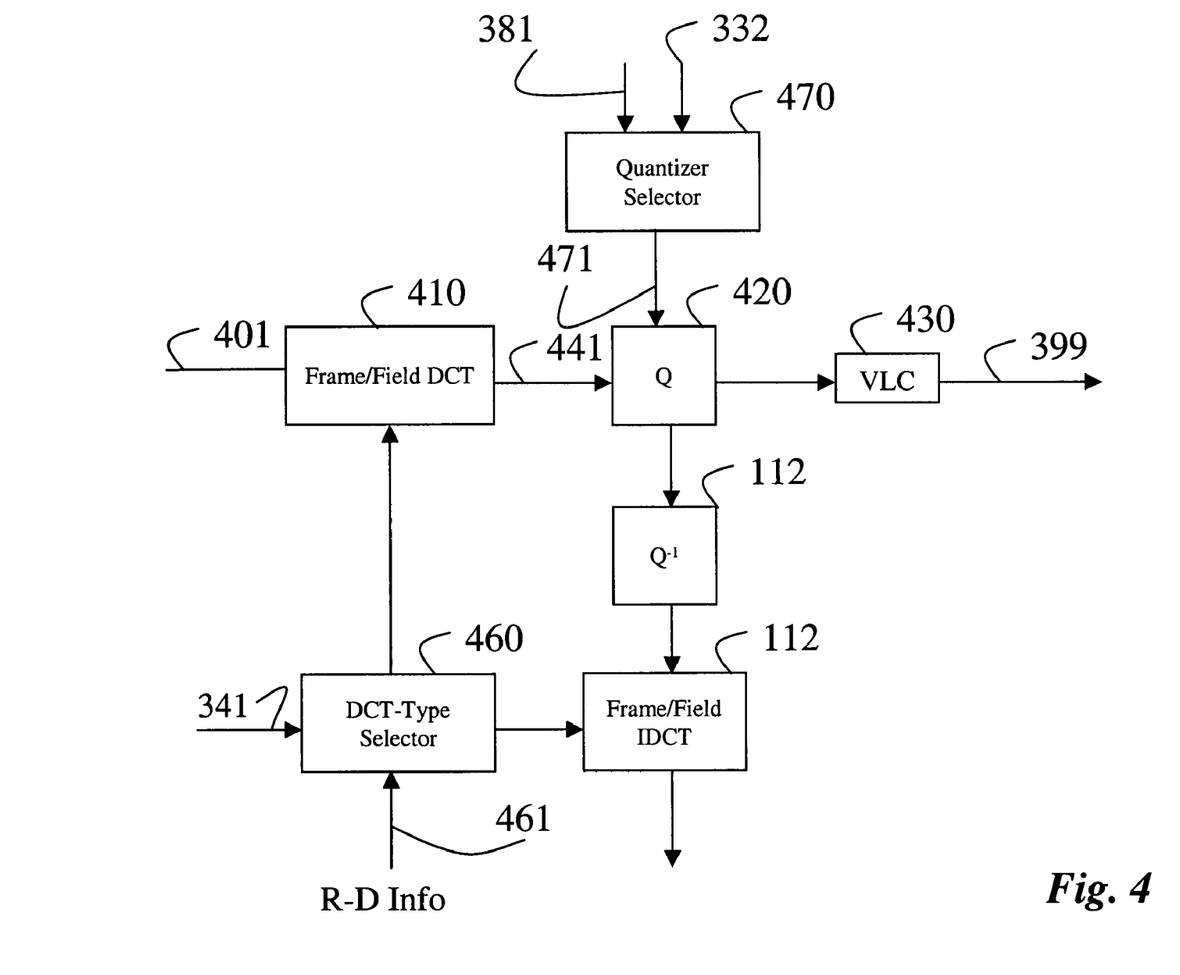
FIG. 4 is a block diagram of an encoding circuit including DCT type selector and quantizer selector according to the invention.

This multiplier value 381 is be used in the coding circuit 400 for encoding the current frame. The number of bits that are used for this encoding are recorded and stored as R1. For the next frame, we adjust the constant c by c=c*(0.5*R1/R+0.5). The reason that we use 0.5*R1/R+0.5 instead of R1/R is that 0.5*R1/R+0.5 provides transition between pictures.

Mode Decision

To select the coding mode 381, we consider a cost function of the form, cost=D+$\lambda$R.

We select the mode that leads to a minimum cost. However, in the above equation, the distortion, D, and rate, R, are not known. Both need to be estimated corresponding to the specified quantization scale. Therefore, we model the R-Q and D-Q relationships of each MB. Based on our experiments, we have found that the distortion is linearly proportional to the quantizer value and the rate is linearly inversely proportional to the quantizer value. Therefore, we model the distortion by $$3D(Q,SAD) = \alpha \times Q \times SAD,$$

where $\alpha$ is a constant coefficient, and model the rate by $$R(Q,SAD) = MV + b \times SAD/Q,$$

where MV is the encoding rate for the motion vector that is obtained by using a look-up table, and b is a constant coefficient.

Coding Circuit

As shown in FIG. 4, the coding circuit 400 includes a DCT 410, a quantizer (Q) 420, a variable length coder (VLC) 430, an inverse quantizer ($Q^{-1}$) 440, an IDCT 450, a DCT type selector 460, and quantizer selector 470, in accordance with the invention. A residual signal 401 is subject to the DCT 410, the resulting transform coefficients 441 are quantized with a quantizer value 471 selected by the quantizer selector. Quantized coefficients 421 are then variable length encoded by VLC 430. As part of the process to form the reconstructed block, the quantized coefficients are inverse quantized 440 and subject to the IDCT 450. The decision to use frame or field DCT is determined by the DCT type selector 460.

The DCT type selector makes use of the multiplier value 341 and R-D information 461 extracted from within the coding circuit. The quantizer selector 380 makes use of the multiplier value and the number of allocated bits 322. Both of these components are described in further detail below.

DCT Type Selection

Figure 5:
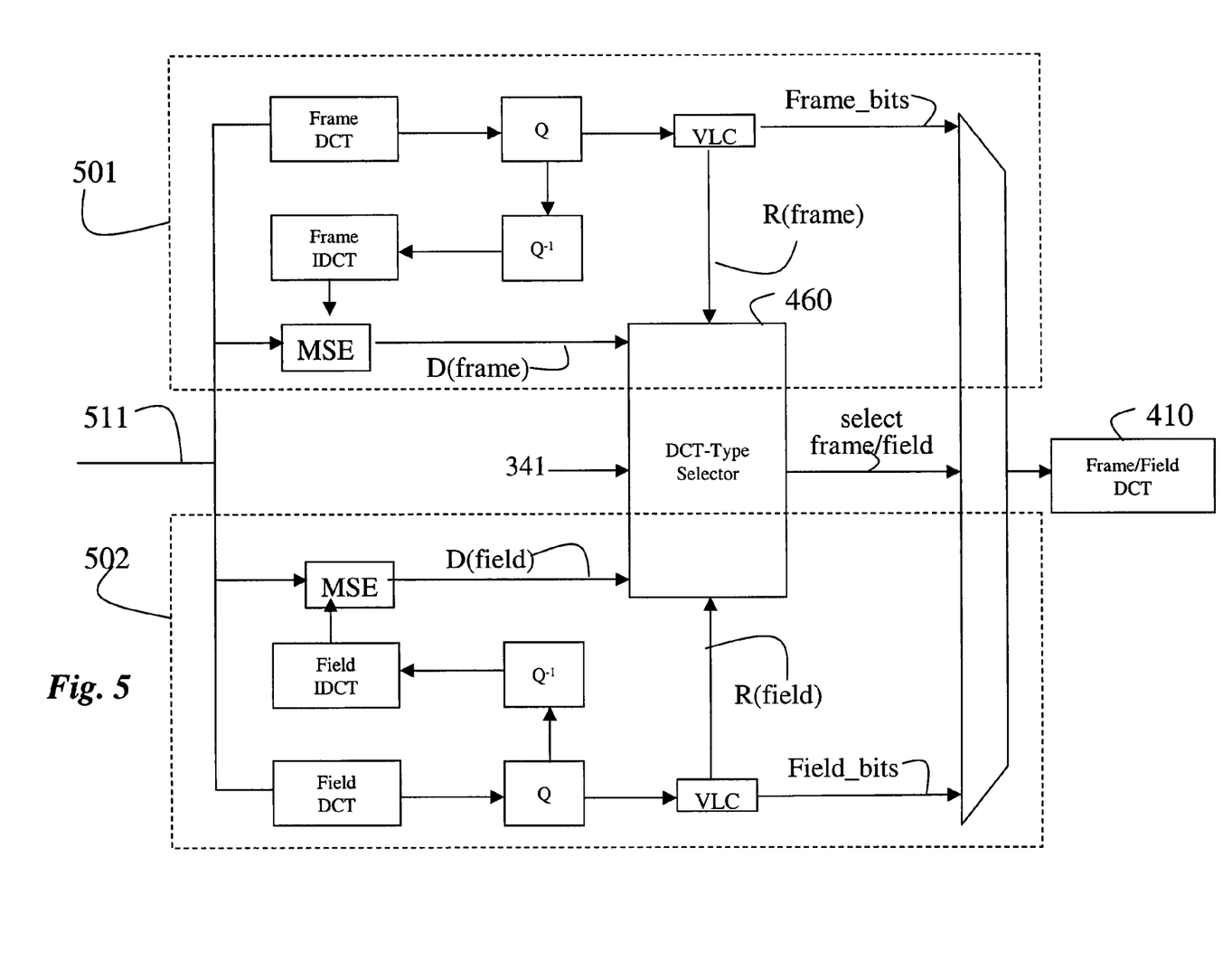
FIG. 5 is a block diagram of a module for extracting rate and distortion information according to the invention.

FIG. 5 shows the components used to extract the R-D information 461 for the DCT type selector 460. The components for frame (top) 501 operate in parallel with the corresponding components for field (bottom) 502. As with the mode decision, we consider a cost function of the form, cost=D+$\lambda$R. In contrast to the cost function that was used for mode selection, this cost function examines the costs associated with encoding a block that uses frame DCT and field DCT. We select the DCT type that leads to a minimum cost.

As shown in FIG. 5, the rate (R) associated with encoding the block, using the frame DCT, is obtained by subjecting the residual 511 to the frame DCT, quantizing (Q) the transform coefficients and VLC. The output of the VLC provides the rate used to code the block with this mode, R(frame). The distortion (D) associated with encoding the block using the frame DCT is obtained by inverse quantizing ($Q^{-1}$) the transform coefficients, and subjecting them to an IDCT. The mean-squared error (MSE) between these values and the original values provide the distortion, D(frame). The rate, R(field), and distortion, D(field), associated with coding the block using the field DCT is obtained similarly.

Given the rate and distortion 461 information determined above, as well as the multiplier value $\lambda$ 341, the cost for the field DCT coding and the cost for the frame DCT coding are compared. The smaller of the two values determines the DCT type that is selected. If the frame/field select is set to frame, then the bits (frame_bits) produced by the VLC corresponding to the encoding the block with frame DCT is for output. Otherwise, if the frame/field select is set to field, then the bits (field_bits) produced by the VLC corresponding to the coding the block with field DCT is for output.

Quantizer Selection

In the prior art, a cost associated with the encoding at every quantization scale $q_i \in \{1, \ldots, 31\}$ is typically determined to find the best quantization scale. We have found that most optimal quantization scales are within a relatively narrow scope when a picture rate constraint or $\lambda$ is given. Therefore, much time is wasted while searching. On the other hand, if a suitable narrow search scope is provided, then a substantial amount of time can be save, with minor impact on quality.

Figure 6:
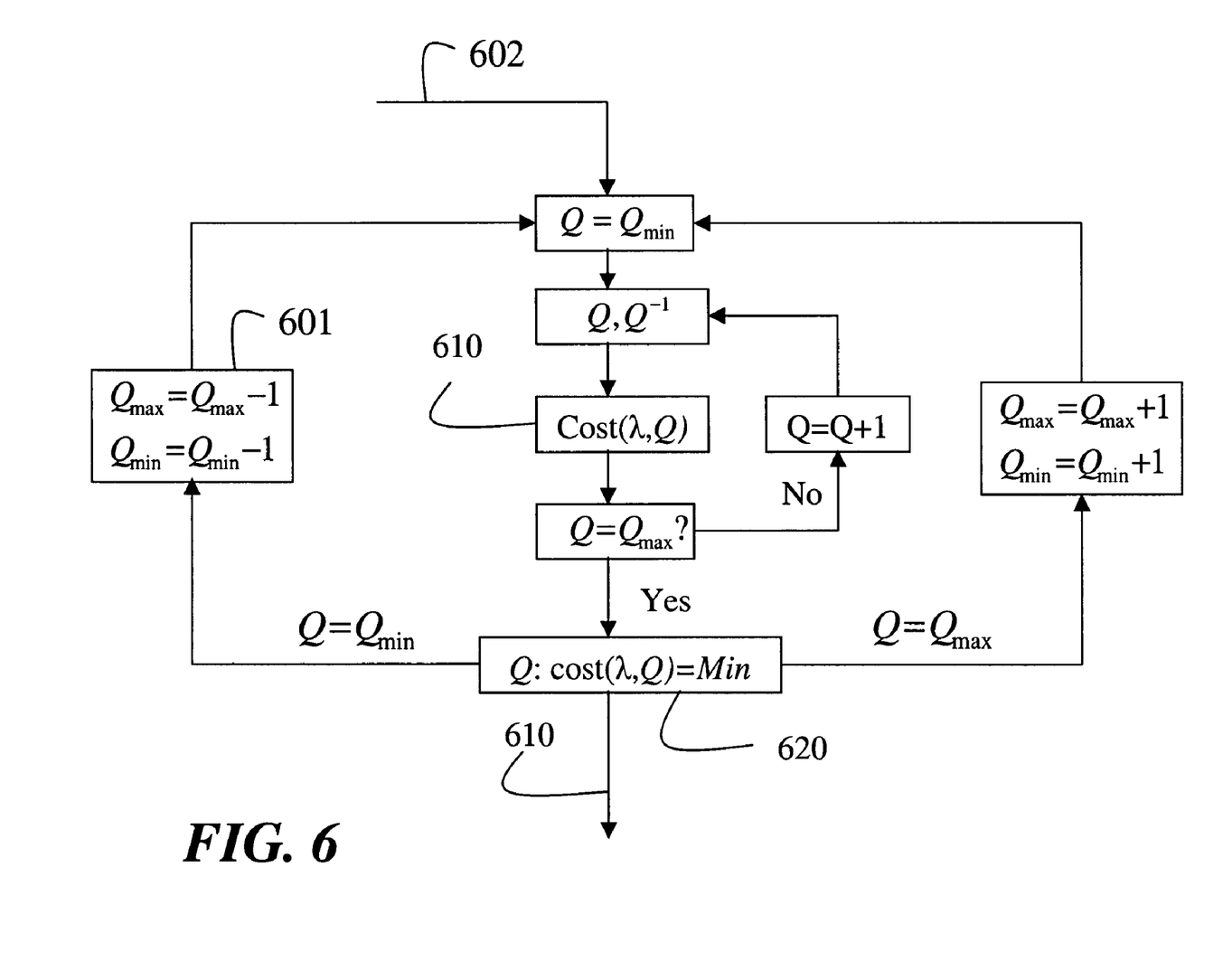
FIG. 6 is a block diagram of a quantizer selector according to the invention.

Therefore, as shown in FIG. 6, the invention selects a quantization scale using a sliding window. Initialize a quantization scale search window $[Q_{min}, Q_{max}]$ 601 based on the value of $\lambda$ in the first frame of each GOP, where $1 \leq Q_{min} < Q_{max} \leq 31$.

For each MB 602, determine 610 a costs for all of the quantization scales in the window 601, and select 620 the quantization scale 603 with the minimum cost.

If the selected quantization scale is equal to Qmax, then the window is moved to the right 641 by $[Q_{min}+1, Q_{max}+1]$, and if the selected quantization scale equal to Qmin, then the window is moved to the left by $[Q_{min}-1, Q_{max}-1]$ 642. If Qmax equal to the maximum quantization scale or Qmin is equal to the minimum quantization, scale such as 1, then it remains the same. In all cases, encode the next MB until all blocks are done.

As described above, the value $\lambda$ is inversely proportional to the picture rate. Equivalently, if $\lambda$ is small, then the selected quantization scale should be small to obtain a large picture rate. On the other hand, if $\lambda$ is large, a large quantization scale should be selected to obtain small picture rate. Hence, the invention uses a linear model to estimate the initial values of the search window as following $$Q_{min}=l \times \lambda, \quad Q_{max}=Q_{min}+w,$$

where l is a constant and w is the width of the window. A cost associated with the encoding at every quantizer value $q_i \in \{1, \ldots, 31\}$ is typically computed to find the best value. We have found that most of the optimal quantizer values are within a relatively narrow range when the rate constraint or $\lambda$ is given. In order to avoid this additional burden of search, a sliding window based selection method is described. A flow diagram of the method is illustrated in FIG. 6.

We first initialize a quantizer value search window $[Q_{min}, Q_{max}]$ based on the value of $\lambda$ in the first frame of each GOP, where $1 \leq Q_{min} < Q_{max} \leq 31$. Then, for each MB, we calculate the costs all of the quantizer values in the current window and select the quantizer value that yields a minimum cost.

If the selected quantizer value is equal to Qmax, then the window is moved to the right, i.e., $[Q_{min}+1, Q_{max}+1]$. If Qmax already equals the maximum quantizer value, typically 31, it is kept unchanged. On the other hand, if the selected quantizer value equals Qmin, then the window is moved left, i.e., $[Q_{min}-1, Q_{max}-1]$. Similarly, if Qmin already equals the minimum quantizer value, typically 1, it is kept unchanged. The next MB is encoded with the above procedure until all of the MBs are encoded.

As mentioned earlier, $\lambda$ is inversely proportional to the picture rate. Equivalently, if $\lambda$ is small, a small quantizer value should be selected to obtain large picture rate. On the other hand, if $\lambda$ is large, a larger quantization value should be selected to obtain small picture rate. Hence, we use a linear model to estimate the initial values of the search window as follows, $Q_{min}=l \times \lambda$, $Q_{max}=Q_{min}+w$, where l is a constant and w is the width of the window.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for encoding a video including a sequence of frames, comprising:

measuring a variance of pixel intensities in a current frame;

assigning, according to rate and buffer fullness constraints, a number of bits to encode the current frame;

determining a multiplier value directly as a function of only the variance and the number of bits assigned to the current frame;

estimating motion vectors between a reference frame and the current frame;

determining a sum of absolute difference (SAD) based on a motion compensated residual between the reference frame and the current frame;

selecting an encoding mode for each macro block in the current frame based on the sum of absolute difference, the motion vectors and the multiplier value; and encoding the motion compensated residual based on the encoding mode, multiplier value and the number of allocated bits.

2. The method of claim 1, in which the encoding further comprises:

determining a quantization scale as a function of only the multiplier value and the number of bits assigned to the current frame;

extracting rate and distortion information associated with encoding each macro block in frame DCT mode and field DCT mode;

selecting a DCT type for each macro block in the current frame based on the multiplier value and the rate and distortion information;

transforming each macro block according to the selected DCT type;

quantizing each transformed macro block according to the selected quantizer; and variable-length coding each quantized macro block as a bitstream.

3. The method of claim 1, in which the multiplier value is $\lambda=2\ln 2 \times \sigma^2 2^{-2R}$, where R is the rate, and $\sigma^2$ is the variance.

4. The method of claim 1, in which the selecting of the encoding mode further comprises:

minimizing a cost function cost=$D+\lambda R$, where D is the distortion, R is the rate, $\lambda$ is the multiplier;

modeling the distortion D by $D(Q, SAD)=a \times Q \times SAD$, where a is a constant coefficient; and modeling the rate by $R(Q,SAD)=MV+b \times SAD/Q$, where MV is an encoding rate for the motion vectors, and b is a constant coefficient.

5. The method of claim 2, in which the selecting of the DCT type is based on the multiplier.

6. The method of claim 2, in which the quantization scale is selected with a sliding window.

* * * * *